(12) United States Patent
Stubblefield et al.

(10) Patent No.: US 7,219,614 B2
(45) Date of Patent: May 22, 2007

(54) APPARATUS AND METHOD FOR REDUCING FLUID DRAG ON A SUBMERGED SURFACE

(75) Inventors: Donald P. Stubblefield, Lake Oswego, OR (US); Jerry D. Stubblefield, Lake Oswego, OR (US)

(73) Assignee: North Shore Partners, Lake Oswego, OR (US)

( * ) Notice: Subject to any disclaimer, the term of this patent is extended or adjusted under 35 U.S.C. 154(b) by 0 days.

(21) Appl. No.: 10/907,795

(22) Filed: Apr. 15, 2005

(65) Prior Publication Data
US 2006/0231004 A1    Oct. 19, 2006

(51) Int. Cl.
*B63B 1/38* (2006.01)
(52) U.S. Cl. .................................................. 114/67 A
(58) Field of Classification Search .............. 114/67 A, 114/67 R
See application file for complete search history.

(56) References Cited

U.S. PATENT DOCUMENTS

| 3,650,235 | A | * | 3/1972 | Swanson | 114/67 A |
| 3,690,283 | A | * | 9/1972 | Pool et al. | 114/67 A |
| 5,988,568 | A | * | 11/1999 | Drews | 244/200 |
| 6,789,491 | B2 | | 9/2004 | Takahashi et al. | |
| 2002/0029731 | A1 | | 3/2002 | Takahashi et al. | |
| 2002/0166491 | A1 | * | 11/2002 | Ha et al. | 114/67 A |
| 2004/0000265 | A1 | * | 1/2004 | Carson | 114/67 R |

* cited by examiner

*Primary Examiner*—Stephen Avila
(74) *Attorney, Agent, or Firm*—Design IP

(57) ABSTRACT

An apparatus and method for reducing surface friction drag on the hull of a surface vessel by entraining air into water flowing in the boundary layer flow along the hull. A hemispherical protrusion creates flow separation by diverting a portion of the water flow away from the surface of the hull, which results in a reduced pressure region downstream from the protrusion. A vent located on the protrusion allow air to flow into the reduced pressure region. The air in the reduced pressure region is entrained into the water due to turbulent mixing from vortices shed on to the rear of the protrusion.

28 Claims, 6 Drawing Sheets

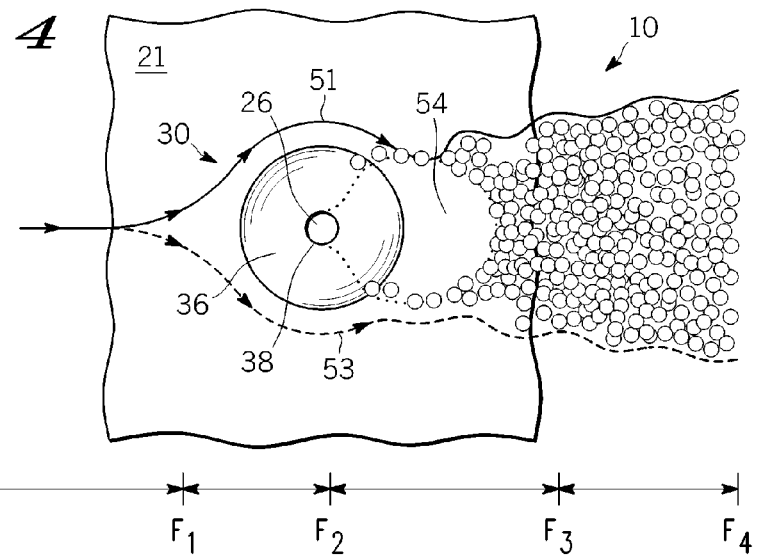
FIG. 4
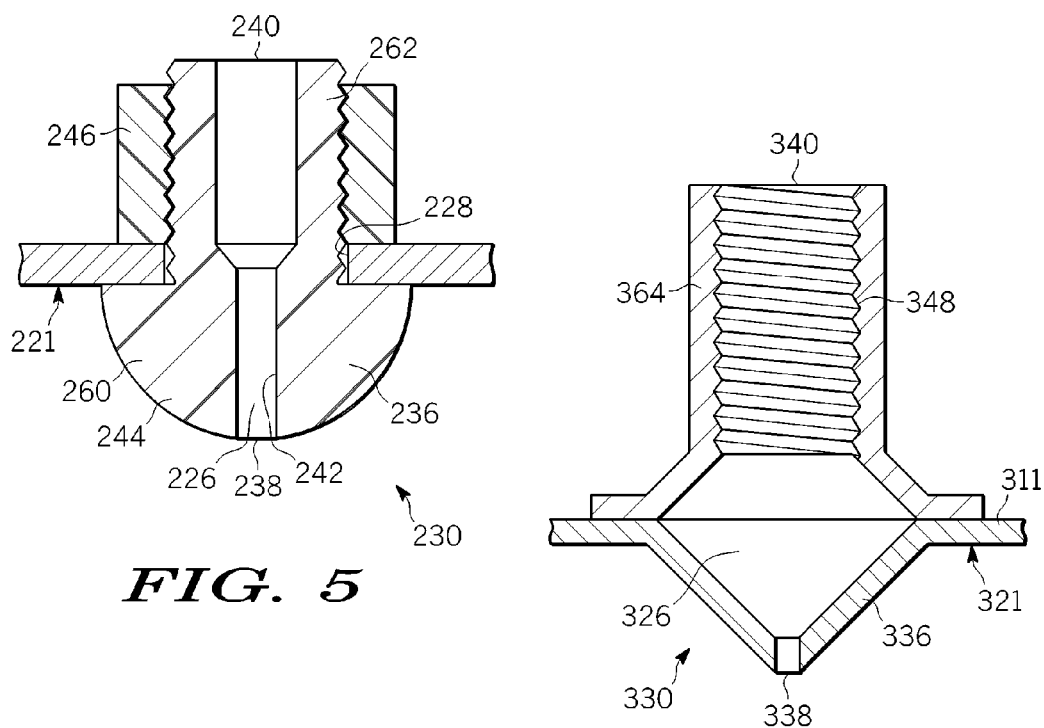
FIG. 5
FIG. 6

APPARATUS AND METHOD FOR REDUCING FLUID DRAG ON A SUBMERGED SURFACE

BACKGROUND OF THE INVENTION

The invention relates to devices and methods for reducing surface friction drag on the hulls of shallow-draft watercraft, such as recreational boats and personal watercraft, and water sport devices, such as wakeboards and water skis. As used herein and in the claims, the term "watercraft" is intended to include all of the above-described watercraft and water sport devices.

Surface friction drag or "skin friction" drag is a significant component of the total power required to propel a watercraft through water. Reducing surface friction drag enables watercraft to travel at higher speeds and/or more efficiently. Accordingly, reducing surface friction drag has been the subject of a great deal of research in the field of watercraft design.

The magnitude of surface friction drag on the submerged surface of a watercraft depends, in part, upon the viscosity of the liquid through which the watercraft is traveling (usually fresh or salt water), the density of the liquid and the surface tension between the liquid and the submerged surface.

The effects of surface friction drag are focused in a "boundary layer," a layer of liquid in which momentum is transferred from the submerged surface to the liquid. Momentum transfer is the greatest in the portion of the liquid that is closest to the submerged surface and decreases to the edge of the boundary layer. Momentum transfer in the boundary layer results in a reduction in the velocity of the water relative to the submerged surface, as well as turbulence.

One means of reducing surface friction drag is the introduction of a gas into the boundary layer, which reduces the fluid density and viscosity in the boundary layer. The relatively low density and viscosity of the gas results in less momentum transfer, and therefore, less surface friction drag. This technique is sometimes referred to in the art as "air lubrication".

Air lubrication has been successfully implemented in hovercraft, in which the vessel sits atop a large cushion of air. Air cushions are not practical for use with most other types of watercraft, however, because water pressure increases with depth, which causes the air cushion to quickly rise to the surface of the water. Enormous amounts of power are required to push an air cushion down into even a few inches of water. This problem has been addressed, in part, by using small bubbles of air (i.e., micro-bubbles) instead of a larger air cushion. Small bubbles rise much more slowly in water than a large air cushion.

Full-scale use of micro-bubbles has been proven very difficult. The inventions of the prior art have faced three major technical challenges in successful use of micro-bubbles to reduce surface friction: (1) injecting micro-bubbles at a sufficient volumetric rate to fill a significant portion of the boundary layer, (2) keeping the micro-bubbles from migrating out of the boundary layer, and (3) adjusting the volumetric flow rate of micro-bubbles as the velocity of the watercraft changes.

Most prior art air lubrication systems use either a pump or pressurized air to supply the volume of micro-bubbles. This approach is deficient in several respects. Firstly, power must be expended to pump or pressurize the air. In all known prior art systems, the power expended to pump or pressurize the air completely offsets the power savings from reduced surface friction drag. Secondly, it is very difficult to inject pumped or pressurized air into the boundary layer. A typical boundary layer is only a few millimeters thick near the bow of the watercraft, which is where the air is injected in most prior art systems. Given that the micro-bubbles themselves are at least one millimeter in diameter and are typically injected at an angle to the direction of flow of the boundary layer, it is very difficult to prevent the micro-bubbles from passing through the boundary layer and into the free-flow water area. Thirdly, the prior art does not provide for an injection flow rate for micro-bubbles that varies in proportion to the watercraft's speed. This results in the micro-bubble injection rate being ideal at only one speed. At all other speeds, the injection rate is higher or lower than the ideal rate.

Pumped or pressured air systems are particularly unsuitable for recreational watercraft because they add significant weight and cost. In the case of wakeboards and water skis, these types of systems are completely impractical.

Accordingly, there is a need for an efficient, light-weight and inexpensive air lubrication system that is capable of entraining air bubbles into the boundary layer of a wide variety of shallow-draft watercraft.

SUMMARY OF THE INVENTION

The invention comprises a device that entrains air into water that is flowing along a surface of an object, such as a watercraft or wakeboard. Multiple devices are preferably arranged on the surface of the object. Each device includes a portion that protrudes from the surface of the object and an opening located on the protruding portion. The opening is connected to a non-pressurized source of air. The protruding portion and the opening are configured to draw air through the opening as water flows over each device at a velocity equal to or greater than a critical velocity relative to the surface of the object.

BRIEF DESCRIPTION OF THE DRAWINGS

FIG. 4 is an enlarged partial bottom view of the hull and entrainment device shown in FIG. 3;

FIG. 5 is an enlarged sectional view taken along line 3—3 of FIG. 2, showing a second embodiment of the entrainment device;

FIG. 6 is an enlarged sectional view taken along line 3—3 of FIG. 2, showing a third embodiment of the entrainment device;

DETAILED DESCRIPTION OF THE PREFERRED EMBODIMENT(S)

Figure 1:
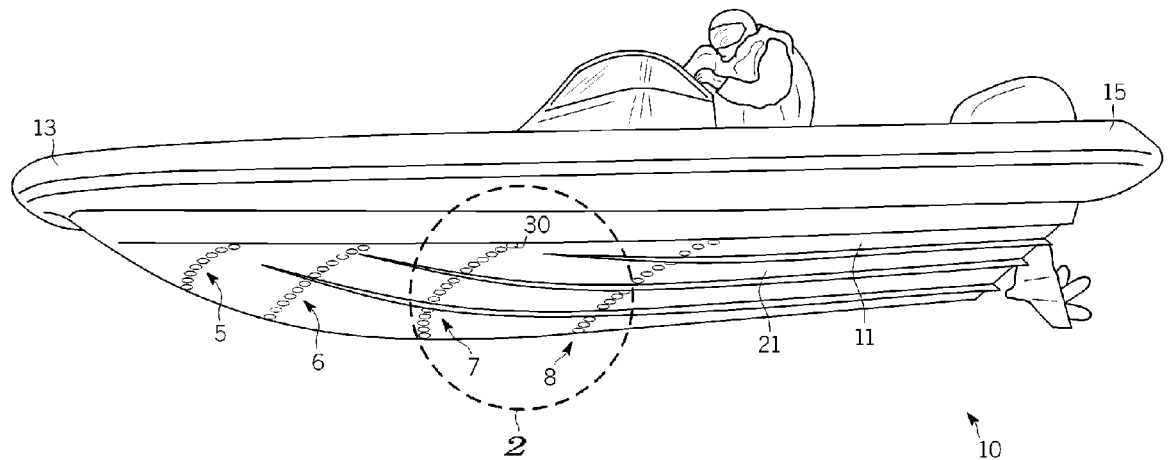
FIG. 1 is a perspective view of a watercraft having arrays of entrainment devices located on its hull.

The principles and operation of the present invention are better understood with reference to the drawings and the accompanying description. In order to aid in understanding of the invention, reference numerals that are referred to in the specification with respect to one or more figures may appear in additional figures without a specific reference to such additional figures in the specification. Except where specifically stated otherwise, terms used herein and in the claims to describe the relative position of elements of the invention, such as above, below, top and bottom are intended to refer to the invention in the orientation shown in FIGS. 1–3, 5–6, 8, 10, and 12.

Figure 2:
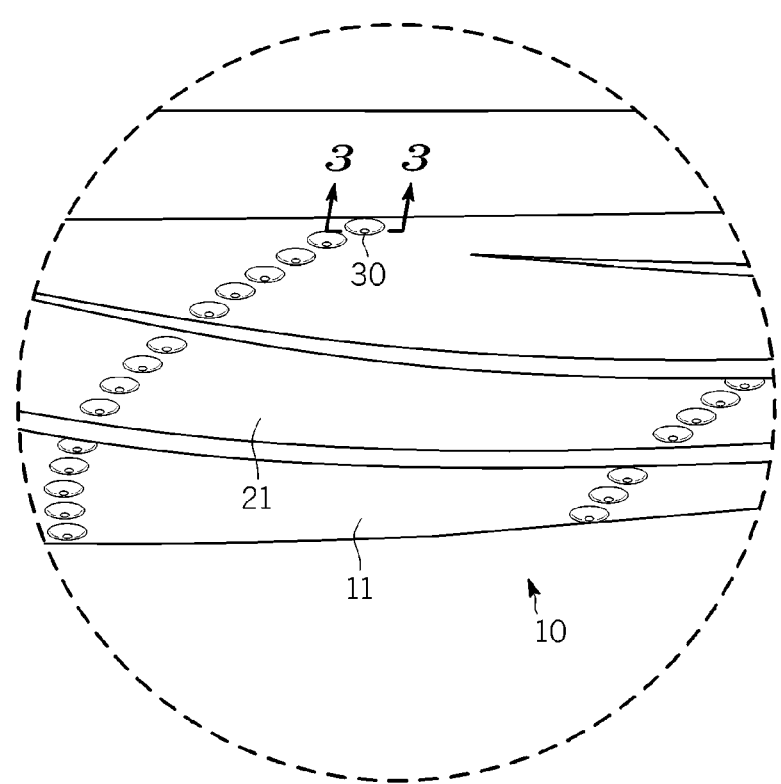
FIG. 2 is an enlarged partial view of area 2—2 from FIG. 1.
Figure 3:
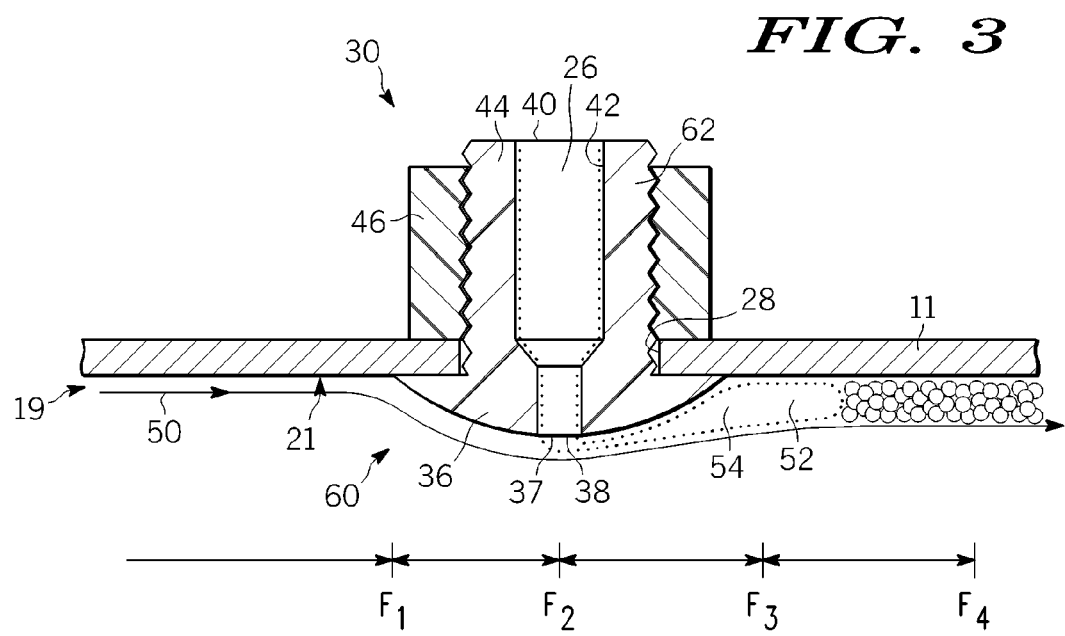
FIG. 3 is an enlarged sectional view taken along line 3—3 of FIG. 2.

Referring to FIGS. 1 and 2, reference numeral 10 refers generally to a watercraft 10 having a hull 111 that extends from a bow 13 to a stern 15. In accordance with the present invention, the hull 11 includes a plurality of entrainment devices 30 arranged in four arrays 5, 6, 7, 8 that extend transversely across the hull 11. Aside from the entrainment devices 30, the watercraft 10 is conventional in structure and configuration. In the interest of simplicity, the cross section of the hull 11 is shown in FIG. 3 as a single layer. As is known in the art, most recreational and high-performance watercraft hulls are formed from molded fiberglass or aluminum.

In the interest of brevity, only one of the entrainment devices 30 will be described in detail. In this embodiment, the other entrainment devices 30 in the arrays 5, 6, 7, 8 are identical thereto. Referring to FIG. 3, the entrainment device 30 comprises a flow diverting member 36 that protrudes from outer surface 21 of the hull 11 and a vent 26 that extends through the hull 11 and is open to the air.

In this embodiment, the flow diverting member 36 is a hemisphere that has been truncated by 80 percent from its base (the end opposite from the hemisphere's apex 37). Other shapes could be used, examples of which will be shown in the additional embodiments described herein.

Broadly stated, the function of the flow diverting member 36 is to entrain air into the water that flows over the flow diverting member 36 by: (1) promoting the flow of air into a diverted flow stream, (2) creating turbulent mixing between the water (primary fluid) and air (secondary fluid) that is introduced through the vent 26, and (3) providing a solid structure that the water (primary fluid) impinges against, which "pinches off" a portion of the air (secondary fluid) against and causes the air (secondary fluid) to become entrained into the water (primary fluid). Preferably, most of the air entrainment occurs in the boundary layer 19 that forms on the surface 21 of the hull 11 as the watercraft 10 moves across a body of water.

The basic function of the entrainment device 30 is to create a reduced pressure region 52 into which air is drawn and to entrain air into the diverted flow stream through turbulent mixing downstream from the entrainment device 30. The location, size, and arrangement of entrainment devices 30 will depend, in part, upon the size, configuration, draft of the watercraft 10.

The function of the vent 26 is to provide a means for air to flow into a reduced pressure region 52 (described in greater detail herein). The vent 26 comprises a lower opening 38 located at the apex 37 of the flow diverting member 36, an upper opening 40 located at the upper-most portion of the device 30 and a wall 42 that connects the two openings. When the watercraft 10 is in use, the upper opening 40 will be open to the air. Both the lower and upper openings 38, 40 are preferably circular. The upper opening 40 is preferably larger than the lower opening 38 in order to accelerate air as it flows from the upper opening 40 to the lower opening 38.

In this embodiment, the entrainment device 30 is formed in two parts: a threaded bolt 44 and a threaded nut 46. The bolt 44 includes a head portion 60 that contains the flow diverting member 36 and a shaft 62 that extends from the head portion 60 through a bore 28 formed in the hull 11. The vent 26 extends through both the head and shaft portions 60, 62. When threaded onto the bolt 44, the nut 46 holds the bolt 44 in place against the hull 11. This embodiment of the invention is suitable for both original equipment and retrofitted applications. Other means of securing the device are possible, some of which are described in connection with the additional embodiments disclosed herein.

The upper opening 40 of the vent 26 is shaped to accommodate attachment to a conduit, such as a hose or pipe (not shown). If provided, the conduit would preferably be routed to a position above the waterline of the hull 11. Use of the conduit is preferred because it will prevent water from flowing into the hull 111 through the vent 26 when the watercraft 10 is stationery or moving at very slow speed. As used in this specification and claims, the "waterline" of a watercraft is intended to refer to the line on the hull to which the hull sinks in the water when the watercraft is under a normal operating load.

It should be noted that, in the preferred embodiments of the present invention, the upper opening 40 of the vent 26 is open to a non-pressurized source of air (the secondary fluid), either by being open to the air, or by being connected to a channel or other conduit that is open to the air. As noted in the background, providing a source of air that is pressurized using a pump, fan, compressed air tank, boiler, or other means that require extra work to be performed on the air to achieve the increased pressure, is not preferred because the extra energy required to pressurize the air would exceed the energy savings realized by the friction reduction associated with air lubrication. As used in the specification and appended claims, the term "non-pressurized" is intended to mean sources of air at normal atmospheric pressure, as well as sources of air in which pressure is increased without expending any energy other than energy used for normal operation of the watercraft 10. For example, a mechanical pump connected to the vent 26 would all be considered pressurized sources, but a forced-induction air intake (not shown) that provides increased air pressure to the vent 26 when the watercraft 10 is moving would be considered a non-pressurized source.

FIGS. 3 and 4 are intended to show, in a simplified manner, diversion of water over the entrainment device 30 and entrainment of air and water downstream from the entrainment device 30. In FIGS. 3 and 4, the watercraft 10 is moving from right to left. Water flowing in the boundary layer 19 and in the vicinity of the entrainment device 30 is referred to herein as the diverted flow stream and is represented in a simplified fashion in FIGS. 3 and 4 by two flow components: a vertically-displaced flow stream 50 and two horizontally-displaced flow streams 51, 53. In reality, the displaced flow stream includes many other flow streams that flow over the flow diverting member 36 having varying vertical and horizontal displacement components. The direction of flow of the flow streams 50, 51, 53 is represented in FIGS. 3 and 4 by arrows drawn thereon.

Referring now to FIG. 3, as the vertically-displaced flow stream 50 approaches the flow diverting member 36, it is diverted over the flow diverting member 36 (beginning at point $F_1$). As the vertically-displaced flow stream 50 reaches the apex 37 of the flow diverting member 36 (near point $F_2$), the vertically-displaced flow stream 50 begins to separate from the flow diverting member 36. The flow separation and increased velocity of the vertically-displaced flow stream 50 results in a reduced pressure region 52 located between the vertically-displaced flow stream 50 and the flow diverting member 36 (between points $F_2$ and $F_3$). The reduced pressure region 52 enables air to be drawn through lower opening 38 of the vent 26 and form a pocket of air 54 in the reduced pressure region 52. As used herein the term "region" and "reduced pressure region" should be understood to mean a three-dimensional region, i.e., a volume.

It should be noted that the flow diverting member 36 is shaped so that the flow separation described in the preceding paragraph will occur when the velocity of the vertically-displaced flow stream 50 relative to the watercraft 10 is within its normal operating range. There is a minimum "critical velocity" below which flow separation may not occur. The magnitude of the critical velocity will vary from one watercraft to another and will depend, among other things, on the shape of the flow diverting member 36 and the depth and pressure of the primary fluid in the vertically-displaced flow stream 50.

Referring now to FIG. 4, the horizontally-displaced flow streams 51, 53 separate from each other as they flow around the flow diverting member 36 and shed vortices (referred to in the art as "von Karman vortices") as they pass the flow diverting member 36. These vortices and recombination of the displaced flow stream create sufficient turbulence between points $F_2$ and $F_4$ to entrain air from the pocket of air 54 into the displaced flow stream.

Entrainment of air into the vertically-displaced flow stream 50 reduces the viscosity and density of the boundary layer flow 19. As discussed above, the reduced viscosity and density in the boundary layer results in a corresponding reduction in skin friction drag. For example, it has been estimated that a 50% air/water mixture will reduce skin friction on the hull of a submerged vessel by about 50%.

FIGS. 5 and 6 show second and third embodiments, respectively, of the entrainment device 30. In the second embodiment, features that correspond to features shown in the first embodiment of the entrainment device 30 are designated by reference numerals that are increased by a factor of 200. For example, the second embodiment of the entrainment device is designated by reference numeral 230. In the third embodiment, features that correspond to features shown in the first embodiment of the entrainment device 30 are designated by reference numerals that are increased by a factor of 300.

The second embodiment of the entrainment device 230 includes a flow diverting member 236 having a full hemispherical shape, instead of the truncated hemispherical shape of the first embodiment of the entrainment device 30. The second embodiment of the entrainment device 230 is otherwise substantially the same as the entrainment device 30.

Referring now to FIG. 6, the third embodiment of the entrainment device 330 includes a flow diverting member 336 that is conical in shape and is stamped or molded into the hull 311 itself. A hollow base 364 (which corresponds to the nut 44 and shaft 62 of the first embodiment) is attached to the hull 311 and is aligned with the flow diverting member 336. Any suitable means of attachment could be used, such as an adhesive bond or a weld, for example. A threaded area 348 is provided immediately below the upper opening 340 that is designed to receive a threaded end of hose or pipe (not shown)—the purpose of which being the same as in the third embodiment.

Figure 7:
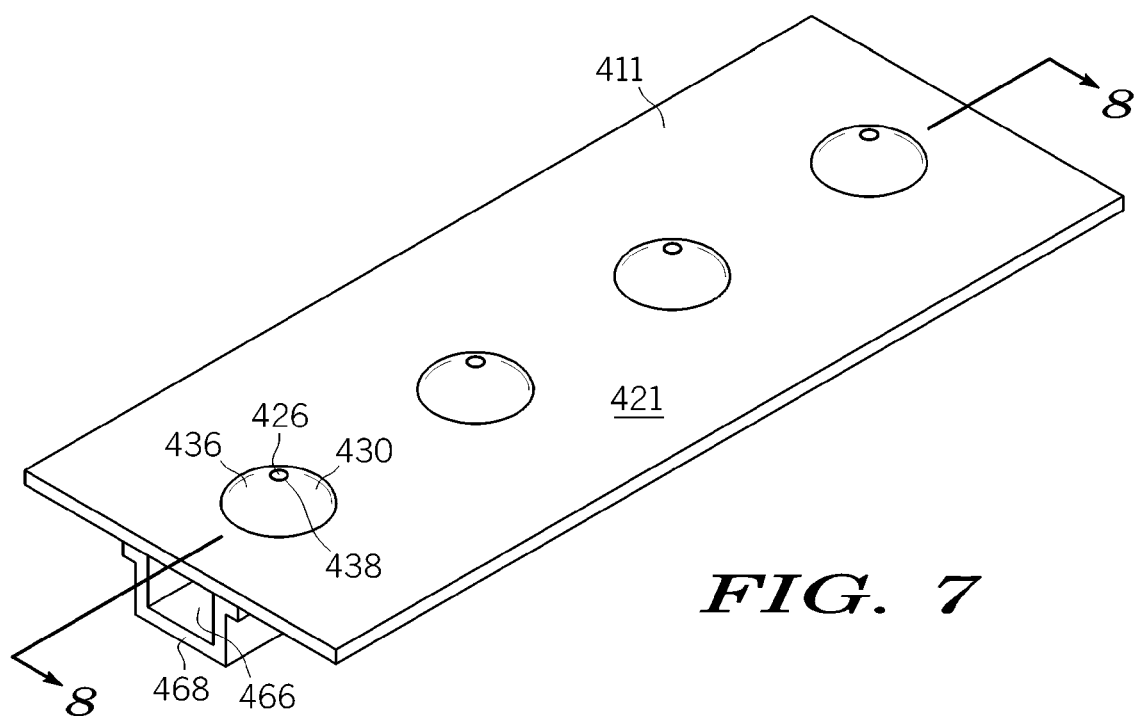
FIG. 7 is an enlarged sectional bottom perspective view of the hull and a fourth embodiment of the entrainment device.
Figure 8:
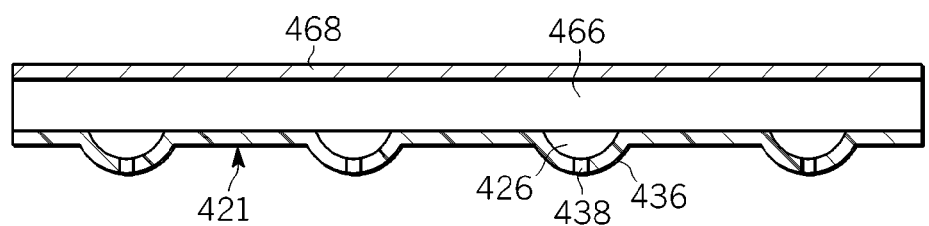
FIG. 8 is a sectional view taken along line 8—8 of FIG. 7.

A fourth embodiment of the invention is shown in FIGS. 7 and 8. In FIGS. 7 and 8, features that correspond to features shown in the first embodiment of the entrainment device 30 are designated by reference numerals that are increased by a factor of 400.

In the fourth embodiment, the flow diverting members 436 are stamped or molded into the hull 411 and a U-shaped bracket 468 is affixed to the hull 411 above the flow diverting members 436. The bracket 468 is preferably watertight and is vented to the air at a point above the waterline of the watercraft 410 (not shown). In this embodiment, the vent 426 comprises the lower opening 438 and the open area 466 between the flow diverting members 436 and the bracket 468.

Figure 9:
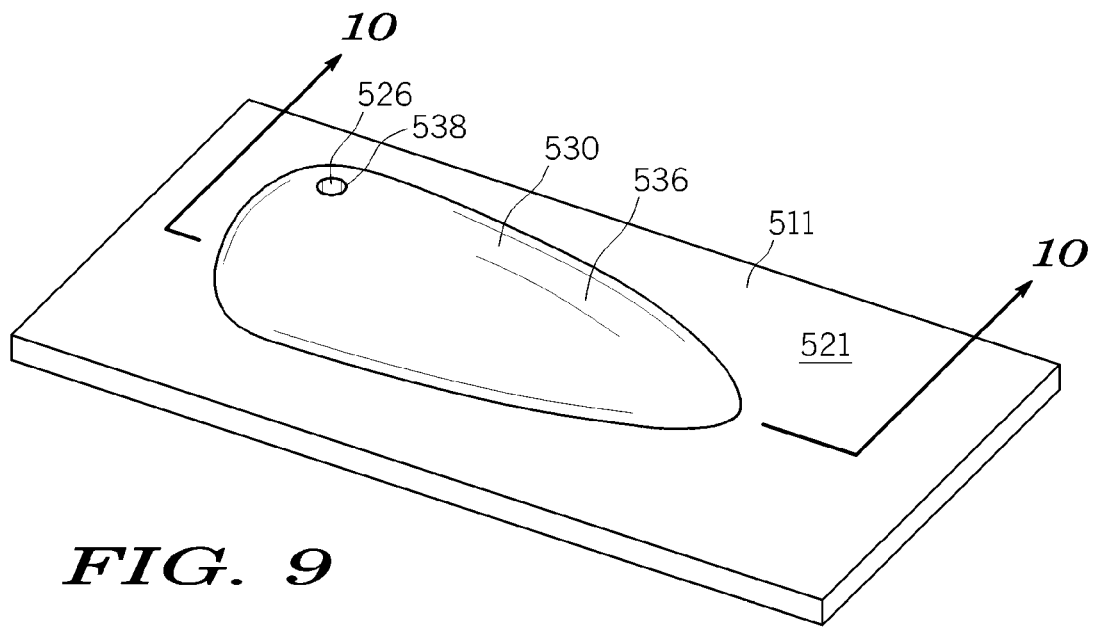
FIG. 9 is an enlarged partial view of the hull and a fifth embodiment of the entrainment device.
Figure 10:
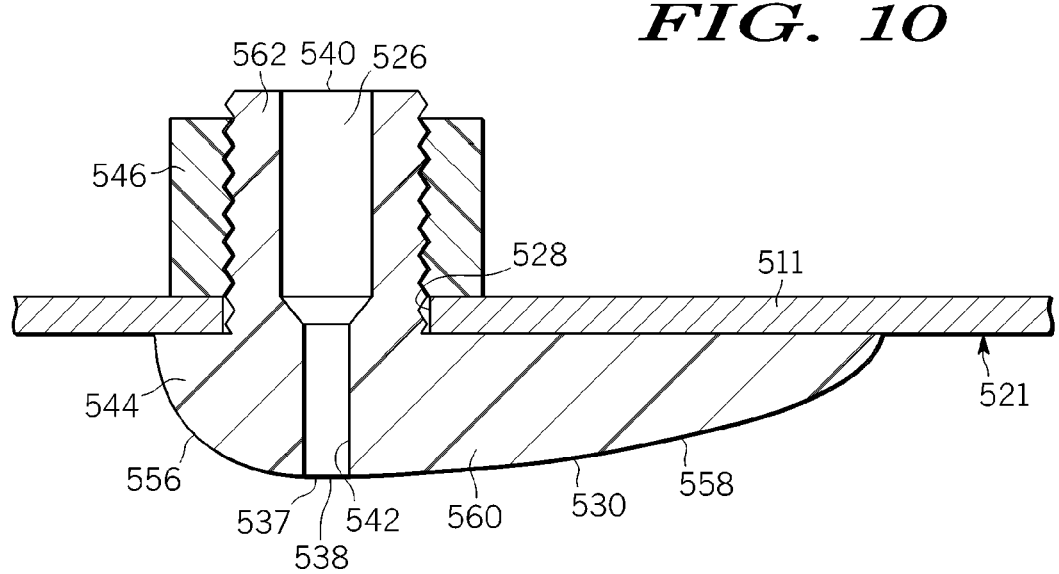
FIG. 10 is a sectional view taken along line 10—10 of FIG. 9, which has been rotated 180 degrees.

A fifth embodiment of the invention is shown in FIGS. 9 and 10. In FIGS. 9 and 10, features that correspond to features shown in the first embodiment of the entrainment device 30 are designated by reference numerals that are increased by a factor of 500.

FIGS. 9 & 10 The entrainment device 530 includes a flow diverting member 536 that is asymmetrical. The flow diverting member 536 has a "teardrop" profile that includes a front face 556 that is similar in shape to the second embodiment and a rear face 558 that is elongated and has a shallower slope than the second embodiment. This embodiment of the present invention is designed for use on watercraft that are operated at relatively high speed and in a single orientation, such as high-performance personal watercraft. The relatively shallow rear face 558 compensates for higher water flow rates and a longer reduced pressure region (not shown, see region 52 in FIG. 3).

Figure 11:
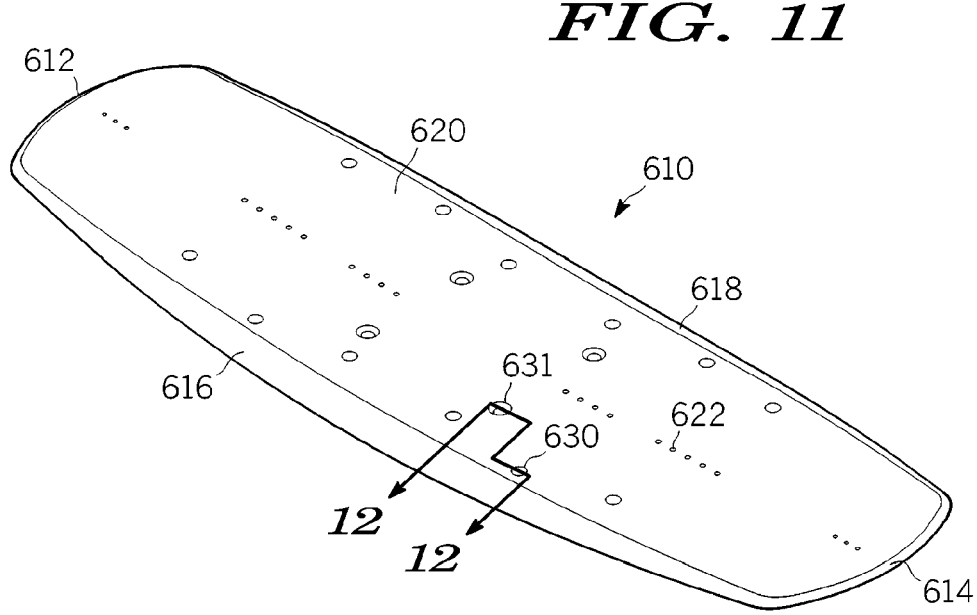
FIG. 11 is a top perspective view of a wakeboard having an array of entrainment devices attached thereto.
Figure 12:
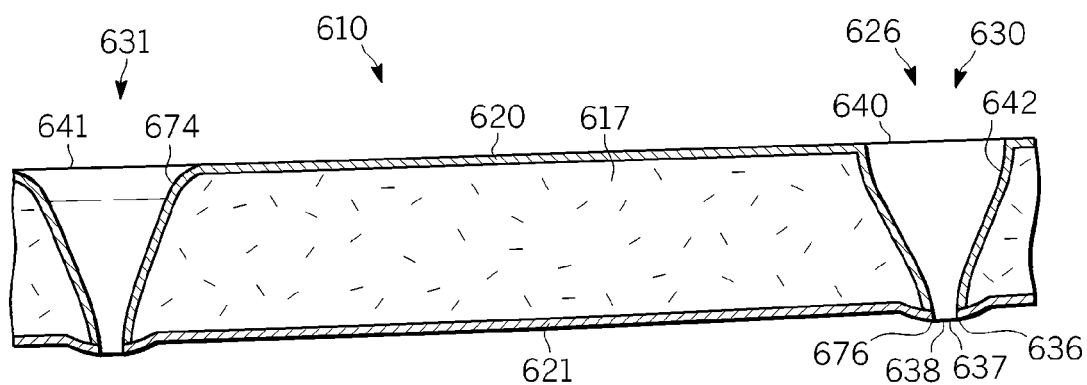
FIG. 12 is an enlarged cross-sectional view taken along line 12—12 of FIG. 11.

A sixth embodiment of the invention is shown in FIGS. 11 and 12. In FIGS. 11 and 12, features that correspond to features shown in the first embodiment of the entrainment device 30 are designated by reference numerals that are increased by a factor of 600. In this embodiment, an array of entrainment devices 630 are affixed to a wakeboard 610. The wakeboard 610 comprises front and rear edges 612, 614 and left side and right side edges 616, 618. The edges 612, 614, 616, 618 form the perimeter of opposing top and base sheets 620, 621. As is conventional, binding holes 622 are provided on the top sheet 620 to allow for attachment of front and rear bindings (not shown). Fins (not shown) may be provided on the base sheet 621 near the rear edge 614 to improve tracking and stability.

The entrainment devices 630 are preferably arranged in arrays that are symmetrical in relation to the longitudinal and transverse centerlines so that the same number of entrainment devices 630 are active regardless of the orientation in which the wakeboard 610 is being ridden.

Two variations of entrainment devices are shown on this embodiment of the wakeboard 610: a flush entrainment device 630 and a recessed entrainment device 631. The recessed entrainment device 631 includes a fillet 674 located at its upper opening 641. The fillet 674 provides a more rounded surface on the top sheet 620 of the wakeboard 610. The recessed entrainment device 631 is otherwise identical to the flush entrainment device 630, which will be described in more detail.

The entrainment device 630 is formed as integral parts of the top sheet 620 and the base sheet 621. The flow diverting member 636 and the lower opening 638 are formed as part of the base sheet 621. The upper opening 640 and wall 642 are formed as part of the top sheet 620. The lowermost edge 676 of the wall 642 is bonded during manufacturing to the base sheet 621. Any suitable bonding method know in the art, such as using a resin adhesive, could be used.

It would be possible to retro-fit entrainment devices onto conventional wakeboards. Due to the relatively low cost of the wakeboard itself, however, the expense of retrofitting is likely to be prohibitively high.

It is recognized by those skilled in the art, that changes may be made to the above-described embodiments of the invention without departing from the broad inventive concept thereof. It is understood, therefore, that this invention is not limited to the particular embodiments disclosed but is intended to cover all modifications which are in the spirit and scope of the invention

What is claimed is:

1. An apparatus that entrains a secondary fluid into a primary fluid flow flowing along a surface of an object, the apparatus comprising:
    at least one member located on the surface of the object, the at least one member having a first portion that protrudes from the surface of the object and an opening located on the first portion, the opening being connected to a non-pressurized source of the secondary fluid; and
    wherein the first portion and the opening are configured to draw the secondary fluid through the opening as a first portion of the primary fluid flows over the at least one member at a velocity equal to or greater than a first critical velocity relative to the surface of the object; and
    wherein the first portion of the at least one member includes an apex and the opening is located at the apex.

2. The apparatus of claim 1, wherein the first portion is shaped to create flow separation between a first portion of the primary fluid and the surface of the object as the first portion of the primary fluid flows over the at least one member at a velocity equal to or greater than a second critical velocity relative to the surface of the object.

3. The apparatus of claim 2, wherein the flow separation of the first portion of the primary fluid defines a first region located between the surface of the object and the first portion of the primary fluid; and
    the opening located on the first portion of the at least one member enables the secondary fluid to flow into the first region when the flow separation occurs.

4. The apparatus of claim 1, wherein the first portion of the at least one member is hemispherical in shape.

5. The apparatus of claim 4, wherein the first portion of the at least one member comprises a portion of a hemisphere, the portion of the hemisphere consisting of a hemisphere that has been truncated by at least 50%.

6. The apparatus of claim 1, wherein the first portion of the at least one member is teardrop shaped.

7. The apparatus of claim 6, wherein the opening is connected to a channel that provides a source of the secondary fluid to the opening.

8. The apparatus of claim 7, wherein the object includes a waterline and the channel comprises a first end that is distal to the member and is located above the waterline.

9. The apparatus of claim 1, wherein the density of the primary fluid is greater than the density of the secondary fluid.

10. The apparatus of claim 9, wherein the primary fluid is a liquid and the secondary fluid is a gas.

11. The apparatus of claim 10, wherein the primary fluid is water and the secondary fluid is air.

12. The apparatus of claim 1, wherein the at least one member comprises a plurality of members.

13. The apparatus of claim 12, wherein the apparatus comprises a wakeboard having a centerline and the plurality of members are arranged in two arrays that are symmetrical with respect to the centerline.

14. The apparatus of claim 1, wherein the at least one member further comprises a portion adapted to connect to a conduit.

15. The apparatus of claim 1, wherein at least a portion of the at least one member comprises a portion of the surface of the object.

16. An apparatus that entrains a secondary fluid into a primary fluid flow flowing along a first surface of an object, the apparatus comprising:
    at least one member located on the first surface, each of the at least one member having a first portion that protrudes from the first surface, the first portion having a second surface that meets the surface of the object along a perimeter and extends from the perimeter to an apex; and
    a first opening located at the apex, the first opening being connected to a non-pressurized source of the secondary fluid, the first opening being encircled by the second surface.

17. The apparatus of claim 16, wherein the second surface is convex in overall shape.

18. The apparatus of claim 17, wherein the shape of the second surface is a truncated hemisphere.

19. The apparatus of claim 18, wherein the shape of the second surface is a hemisphere.

20. The apparatus of claim 19, wherein the second surface is teardrop-shaped.

21. The apparatus of claim 16, wherein the first portion is a separate part from the first surface.

22. The apparatus of claim 16, wherein the first portion is formed as part of the first surface.

23. The apparatus of claim 16, wherein the first opening faces away from the first surface.

24. The apparatus of claim 16, wherein the first surface defines a first plane in an area immediately surrounding the first portion and the first opening is directed substantially perpendicular to the first plane.

25. An apparatus designed traverse a primary fluid, the apparatus comprising:
    a first surface that is configured to be in contact with primary fluid when the apparatus traverses the primary fluid;
    at least one member located on the first surface, each of the at least one member having a first portion that protrudes from the first surface, the first portion having a second surface that meets the surface of the object along a perimeter and extends from the perimeter to an apex; and
    a first opening located at the apex, the first opening being encircled by the second surface, the first opening being connected to a non-pressurized source of a secondary fluid, the density of the secondary fluid being greater than the density of the primary fluid at equal temperature and pressure.

26. The apparatus of claim 25, wherein the first opening faces away from the first surface.

27. The apparatus of claim 25, wherein the first surface defines a first plane in an area immediately surrounding the first portion and the first opening is directed substantially perpendicular to the first plane.

28. An apparatus that entrails a secondary fluid into a primary fluid flow flowing along a first surface of an object, the apparatus comprising:

at least one member located on the first surface, each of the at least one member having a first portion that protrudes from the first surface, the first portion having a second surface that meets the surface of the object along a perimeter and extends from the perimeter to an apex; and a first opening connected to a non-pressurized source of the secondary fluid, the first opening being encircled by the second surface and facing away from the first surface.

* * * * *